(12) United States Patent
Li et al.

(10) Patent No.: US 10,833,836 B2
(45) Date of Patent: Nov. 10, 2020

(54) MANAGING RELEASE OF RESOURCES FOR UPLINK GRANT-FREE TRANSMISSIONS ON BANDWIDTH PART DEACTIVATION

(71) Applicant: QUALCOMM Incorporated, San Diego, CA (US)

(72) Inventors: Chih-Ping Li, San Diego, CA (US); Jing Jiang, San Diego, CA (US); Linhai He, San Diego, CA (US); Peter PuiLok Ang, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 28 days.

(21) Appl. No.: 16/220,405

(22) Filed: Dec. 14, 2018

(65) Prior Publication Data
US 2019/0190681 A1    Jun. 20, 2019

Related U.S. Application Data

(60) Provisional application No. 62/608,233, filed on Dec. 20, 2017.

(51) Int. Cl.
*H04L 5/00* (2006.01)
*H04W 76/27* (2018.01)
(Continued)

(52) U.S. Cl.
CPC ......... *H04L 5/0098* (2013.01); *H04W 72/042* (2013.01); *H04W 76/27* (2018.02);
(Continued)

(58) Field of Classification Search
None
See application file for complete search history.

(56) References Cited

U.S. PATENT DOCUMENTS

2018/0183551 A1*  6/2018  Chou ................. H04W 72/044
2018/0288746 A1*  10/2018  Zhang ................. H04L 1/0031
(Continued)

FOREIGN PATENT DOCUMENTS

WO    2018184435 A1    10/2018

OTHER PUBLICATIONS

Huawei: "Summary of [99bis#41] [NR UP/MAC] Open Issues on SPS and GF—Huawei," 3GPP Draft; R2-1713173 Summary of [99BIS#41]NR_UP_MAC Email Discussion for SPS and GF, 3rd Generation Partnership Project (3GPP), Mobile Competence Centre; 650, Route Des Lucioles; F-06921 Sophia-AN, vol. RAN WG2, No. Reno, United States; Nov. 27, 2017-Dec. 1, 2017, Nov. 17, 2017, XP051371975, 58 Pages, Retrieved from the Internet: URL: http://www.3gpp.org/ftp/tsg%5Fran/WG2%5FRL2/TSGR2%5F100/Docs/, [retrieved on Nov. 17, 2017].
(Continued)

*Primary Examiner* — Anh Vu H Ly
(74) *Attorney, Agent, or Firm* — Qualcomm Incorporated

(57) ABSTRACT

Various aspects of the present disclosure generally relate to wireless communication. In some aspects, a user equipment (UE) may receive a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part. The UE may receive determine to deactivate the first bandwidth part and activate a second bandwidth part, and may determine to reactivate the first bandwidth part. The UE may identify second resources for uplink grant-free transmissions by the UE on the first bandwidth part based at least in part on the bandwidth part configuration. Numerous other aspects are provided.

40 Claims, 13 Drawing Sheets

(51) Int. Cl.
*H04W 76/38* (2018.01)
*H04W 76/34* (2018.01)
*H04W 72/04* (2009.01)

(52) U.S. Cl.
CPC .......... *H04W 76/34* (2018.02); *H04W 76/38* (2018.02); *H04L 5/001* (2013.01); *H04L 5/0048* (2013.01)

(56) References Cited

U.S. PATENT DOCUMENTS

2019/0132824 A1* 5/2019 Jeon .................... H04L 5/00
2019/0132862 A1* 5/2019 Jeon .................... H04L 5/0087

OTHER PUBLICATIONS

International Search Report and Written Opinion—PCT/US2018/066067—ISA/EPO—dated Feb. 27, 2019.
Qualcomm et al: "Draft LS on BWP Timer Operation," 3GPP Draft; R1-1721668 LS on BWP Timer Operation, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Dec. 4, 2017, XP051370748, 2 Pages, Retrieved from the Internet: URL: http://www.3gpp.org/ftp/tsg%5Fran/WG1%5FRL1/TSGR1%5F91/Docs/ [retrieved on Dec. 4, 2017].

\* cited by examiner

MANAGING RELEASE OF RESOURCES FOR UPLINK GRANT-FREE TRANSMISSIONS ON BANDWIDTH PART DEACTIVATION

CROSS-REFERENCE TO RELATED APPLICATIONS UNDER 35 U.S.C. § 119

This application claims priority to U.S. Provisional Patent Application No. 62/608,233, filed on Dec. 20, 2017, entitled "TECHNIQUES AND APPARATUSES FOR MANAGING RELEASE OF RESOURCES FOR UPLINK GRANT-FREE TRANSMISSIONS ON BANDWIDTH PART DEACTIVATION," which is hereby expressly incorporated by reference herein.

FIELD OF THE DISCLOSURE

Aspects of the present disclosure generally relate to wireless communication, and more particularly to techniques and apparatuses for managing release of resources for uplink grant-free transmissions on bandwidth part deactivation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include transmitting, to a UE, a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part; transmitting a first message to deactivate the first bandwidth part; and managing the first resources of the deactivated first bandwidth part based at least in part on the bandwidth part configuration.

In some aspects, a method of wireless communication, performed by a user equipment, may include receiving a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part; determining to deactivate the first bandwidth part and activate a second bandwidth part; determining to reactivate the first bandwidth part; and identifying second resources for uplink grant-free transmissions by the UE on the first bandwidth part based at least in part on the bandwidth part configuration.

In some aspects, a base station for wireless communication may include memory and one or more processors coupled to the memory. The memory and the one or more processors may be configured to transmit, to a UE, a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part; transmit a first message to deactivate the first bandwidth part; and manage the first resources of the deactivated first bandwidth part based at least in part on the bandwidth part configuration.

In some aspects, a user equipment for wireless communication may include memory and one or more processors coupled to the memory. The memory and the one or more processors may be configured to receive a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part; determine to deactivate the first bandwidth part and activate a second bandwidth part; determine to reactivate the first bandwidth part; and identify second resources for uplink grant-free transmissions by the UE on the first bandwidth part based at least in part on the bandwidth part configuration.

In some aspects, a non-transitory computer-readable medium may store one or more instructions for wireless communication. The one or more instructions, when executed by one or more processors of a base station, may cause the one or more processors to transmit, to a UE, a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part; transmit a first message to deactivate the first bandwidth part; and manage the first resources of the deactivated first bandwidth part based at least in part on the bandwidth part configuration.

In some aspects, a non-transitory computer-readable medium may store one or more instructions for wireless communication. The one or more instructions, when executed by one or more processors of a user equipment, may cause the one or more processors to receive a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part; determine to deactivate the first bandwidth part and activate a second bandwidth part; determine to reactivate the first bandwidth part; and identify second resources for uplink grant-free transmissions by the UE on the first bandwidth part based at least in part on the bandwidth part configuration.

In some aspects, an apparatus for wireless communication may include means for transmitting, to a UE, a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part; means for transmitting a first message to deactivate the first bandwidth part; and means for managing the first resources of the deactivated first bandwidth part based at least in part on the bandwidth part configuration.

In some aspects, an apparatus for wireless communication may include means for receiving a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part; means for determining to deactivate the first bandwidth part and activate a second bandwidth part; means for determining to reactivate the first bandwidth part; and means for identifying second resources for uplink grant-free transmissions by the UE on the first bandwidth part based at least in part on the bandwidth part configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
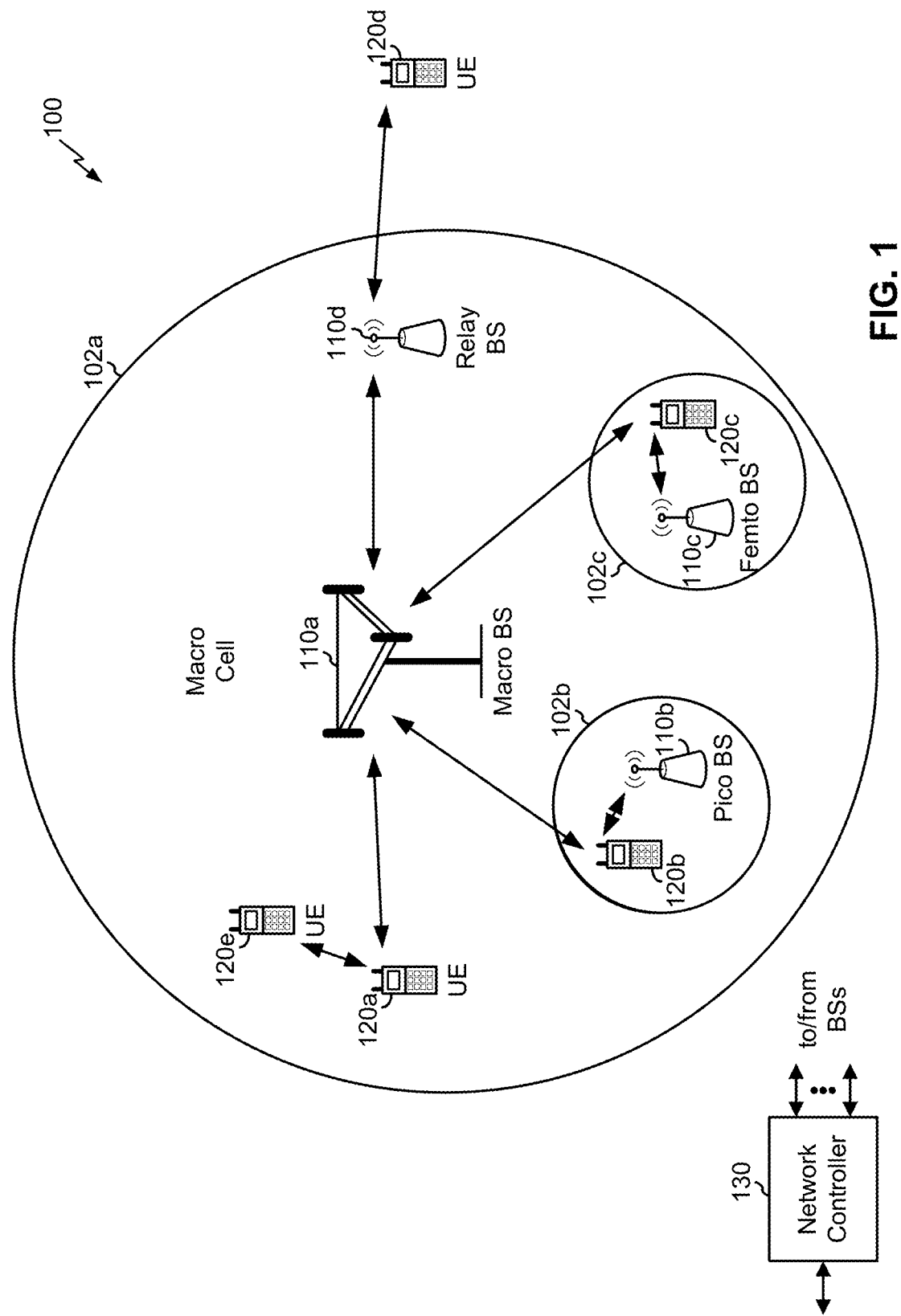
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
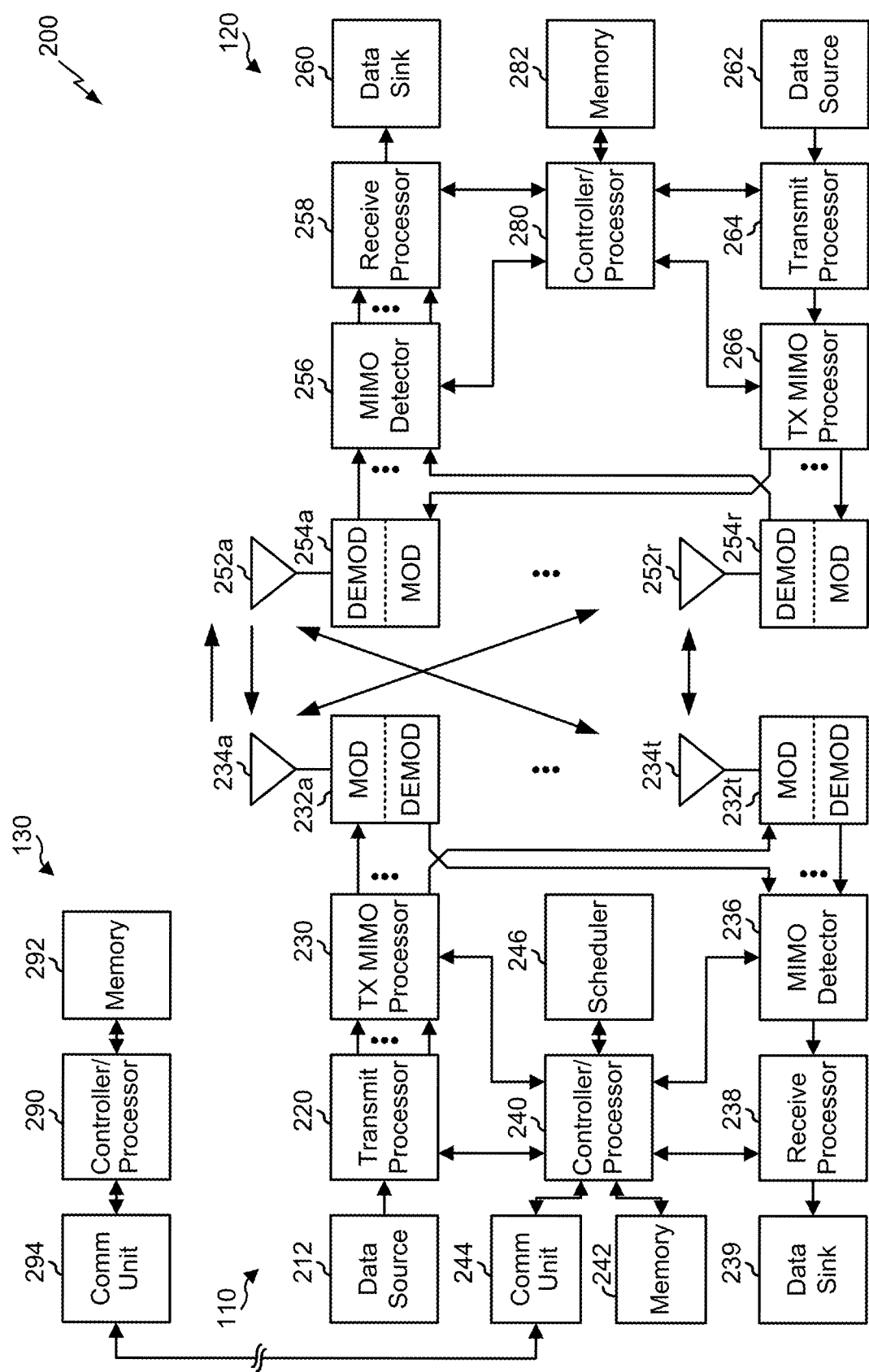
FIG. 2 is a block diagram conceptually illustrating an example of a base station in communication with a user equipment (UE) in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with managing release of resources for uplink grant-free transmissions on bandwidth part deactivation, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a bandwidth part configuration for a plurality of bandwidth parts, wherein a first bandwidth part of the plurality of bandwidth parts is identified as being activated and is associated with first resources allocated for uplink grant-free transmissions by the UE 120 on the first bandwidth part; means for determining to deactivate the first bandwidth part and activate a second bandwidth part; means for determining to reactivate the first bandwidth part; means for identifying second resources for uplink grant-free transmissions by the UE 120 on the first bandwidth part based at least in part on the bandwidth part configuration; and/or the like. In some aspects, such means may include one or more components of UE 120 described in connection with FIG. 2.

In some aspects, base station 110 may include means for transmitting, to a UE, a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part; means for transmitting a first message to the UE to deactivate the first bandwidth part; means for managing the first resources of the deactivated first bandwidth part in relation to the UE based at least in part on the bandwidth part configuration; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
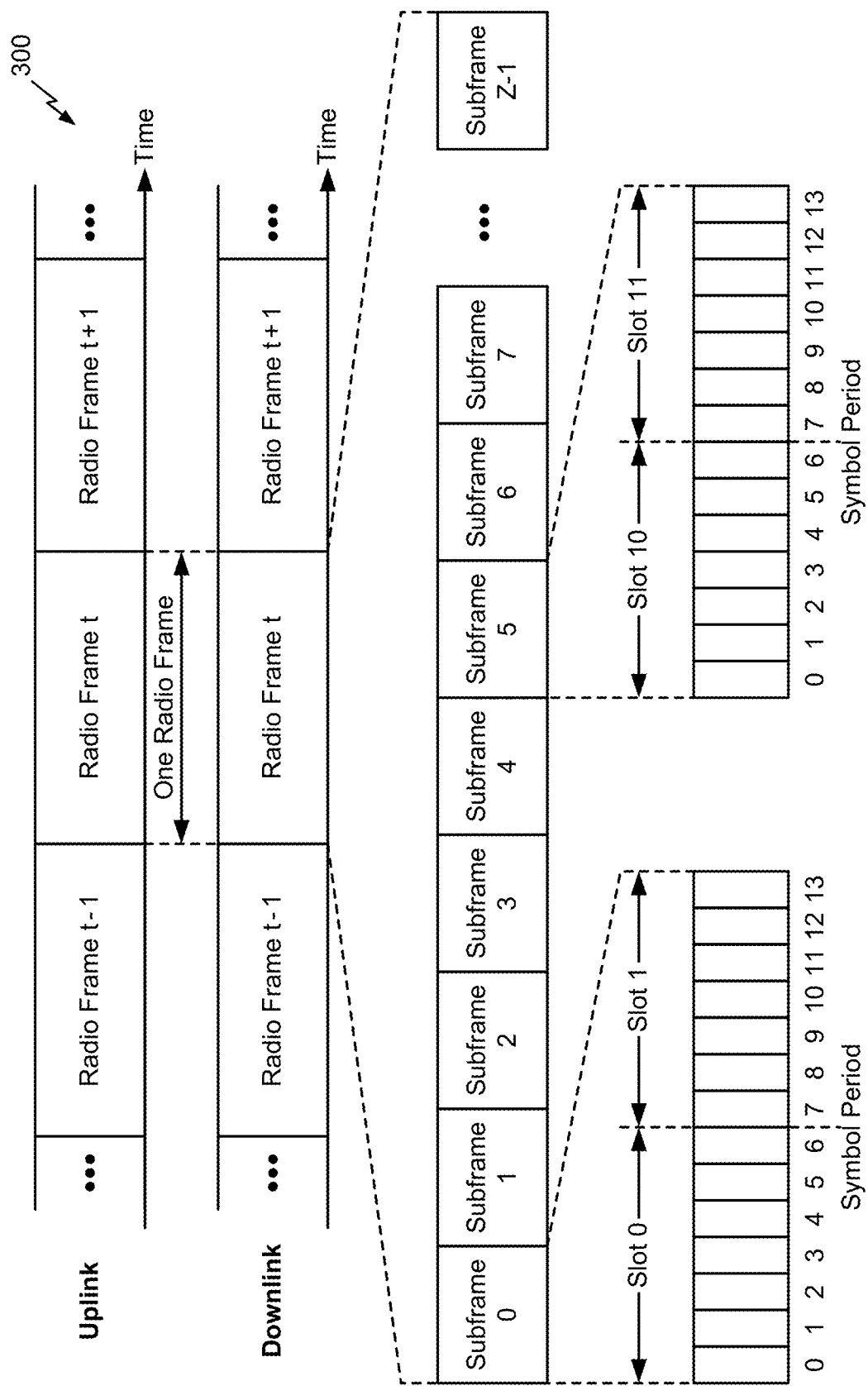
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
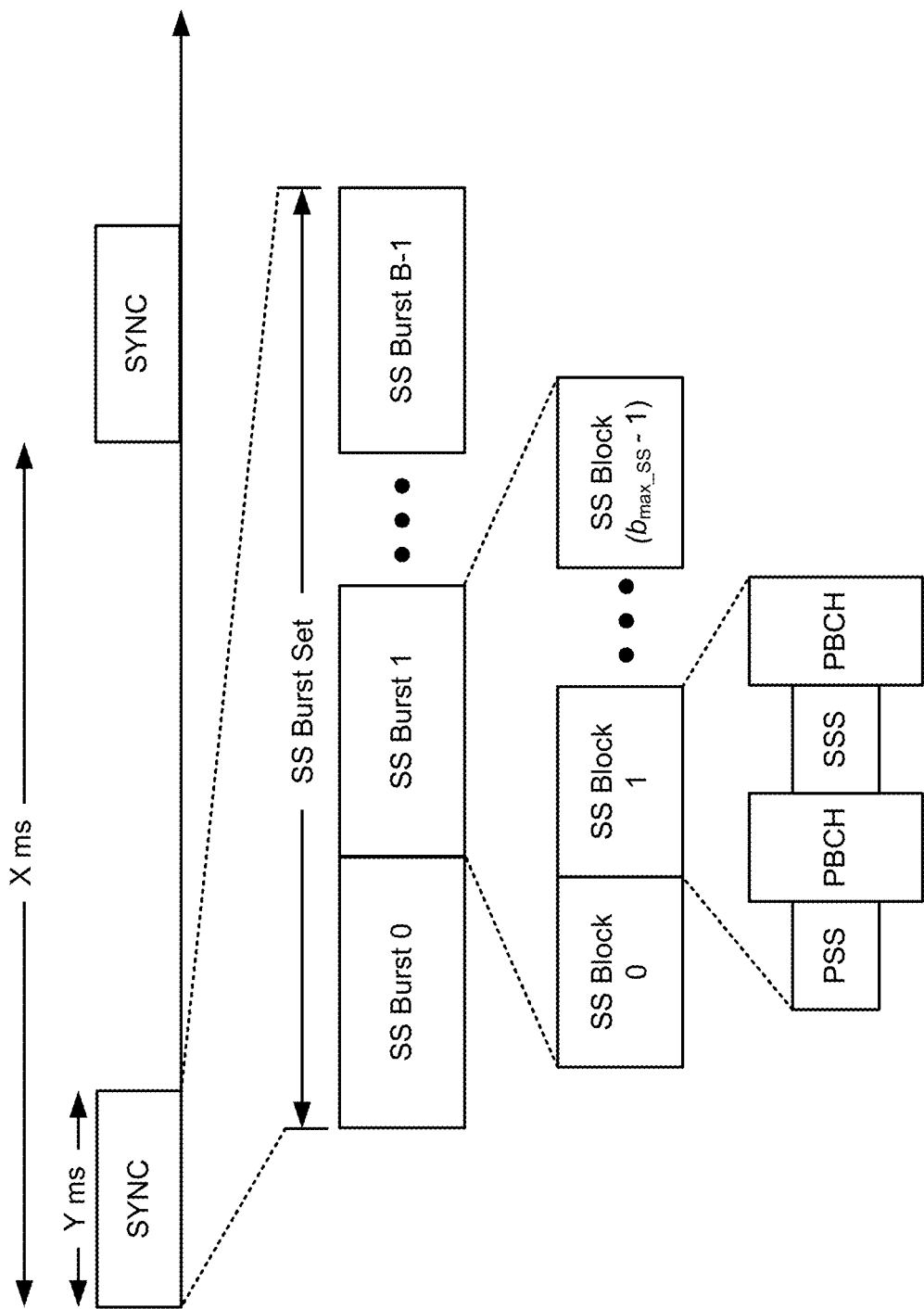
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBS) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
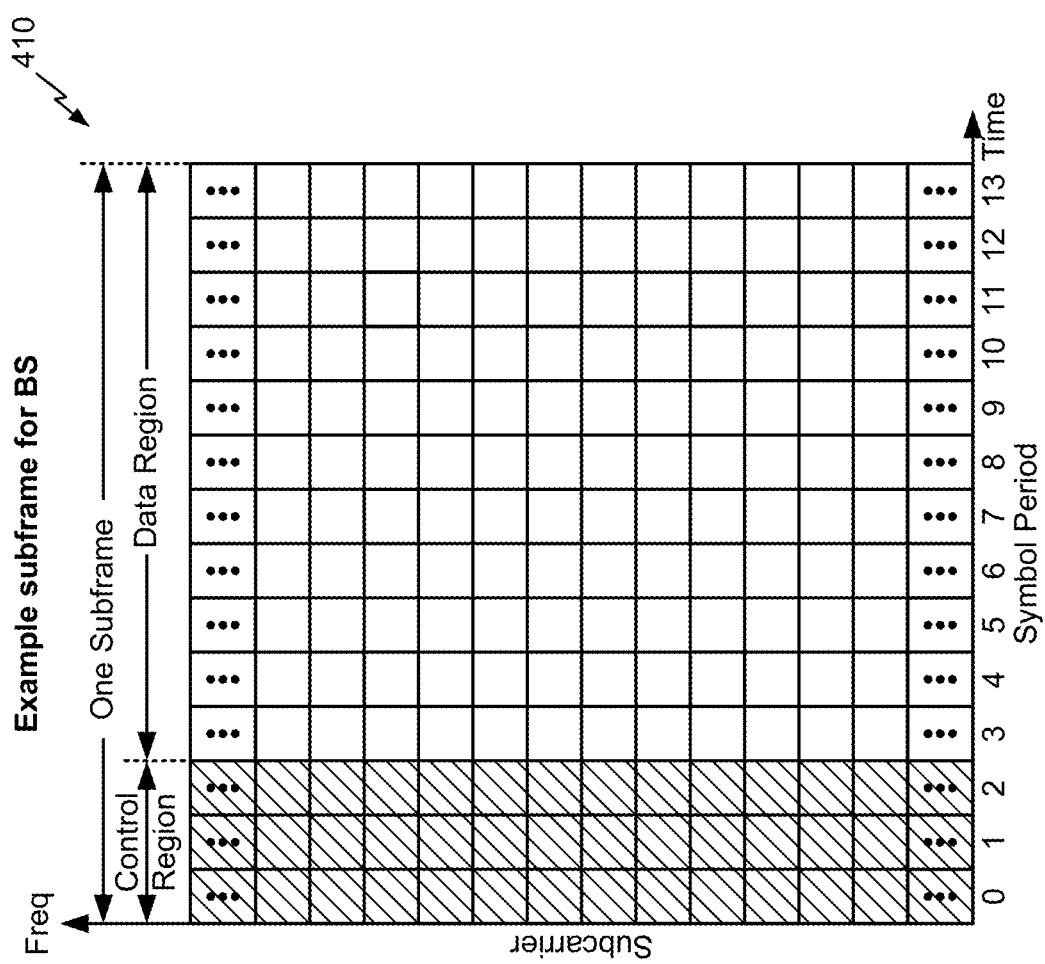
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers)

in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

FIGS. 5-8 are diagrams illustrating example scenarios associated with bandwidth part management, in accordance with various aspects of the present disclosure.

New Radio (NR) supports the use of multiple different numerologies (e.g., subcarrier spacing options of 15 kHz, 30 kHz, 60 kHz, 120 kHz, and/or the like) and multiple different slot durations (e.g., 0.5 ms, 0.25 ms, 0.125 ms, and/or the like). Furthermore, a wideband bandwidth (e.g., a system bandwidth and/or the like) in NR may be up to 100 MHz (e.g., for the sub-6 GHz frequency band), up to 400 MHz (e.g., for a frequency band above 6 GHz), and/or the like. In some cases, there may be scenarios where a UE 120 only monitors or is only served with a subset of the wideband bandwidth. This subset may be referred to as a bandwidth part, and may be limited due to a capability of a UE 120, due to a UE 120 being in a power saving mode, and/or the like.

Figure 5:
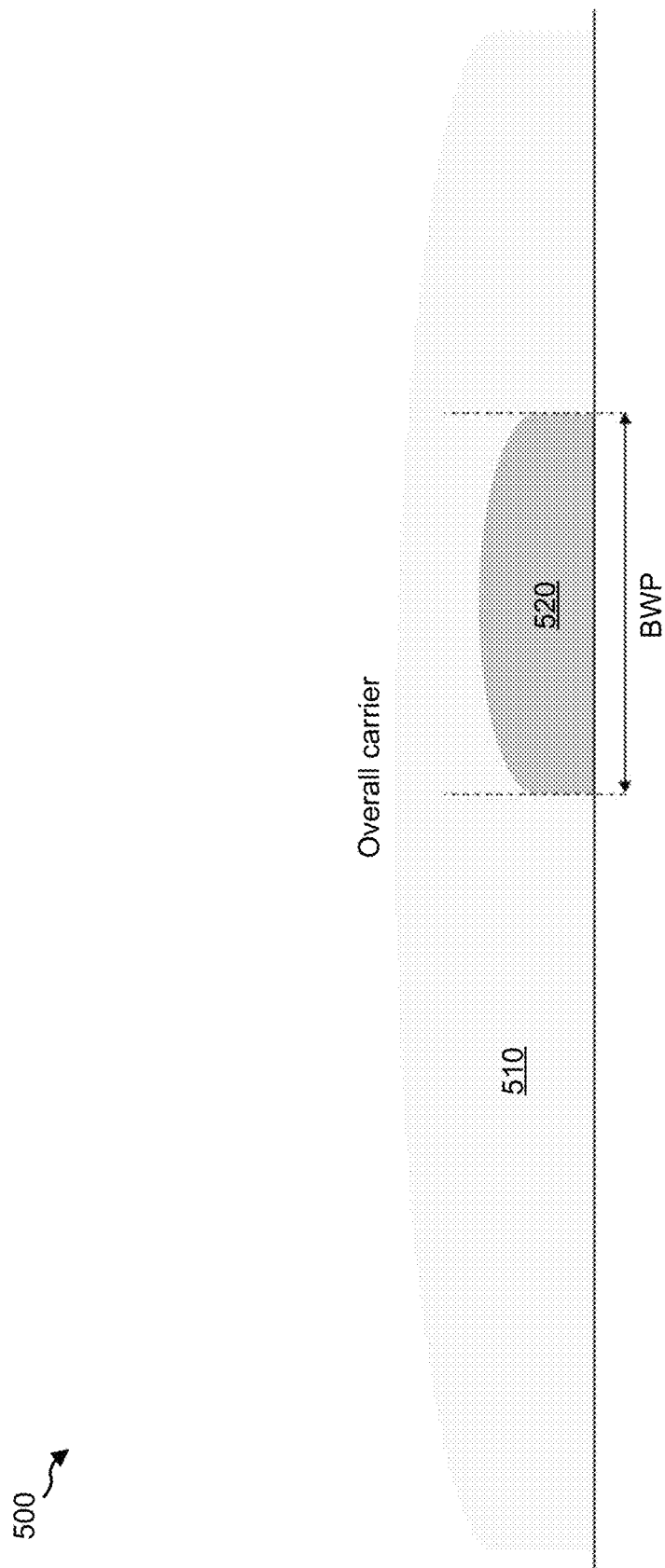
FIGS. 5-8 are diagrams illustrating example scenarios associated with bandwidth part management, in accordance with various aspects of the present disclosure.

For example, as shown in FIG. 5, an overall carrier 510 may span a wideband bandwidth, and a bandwidth part (BWP) 520 may span a portion of the overall carrier 510. For example, the bandwidth part 520 may be less than the overall carrier 510 due to a UE capability, such as a reduced UE bandwidth capability. For example, the UE 120 may be an NB-IoT UE with a limited bandwidth capability.

Figure 6:
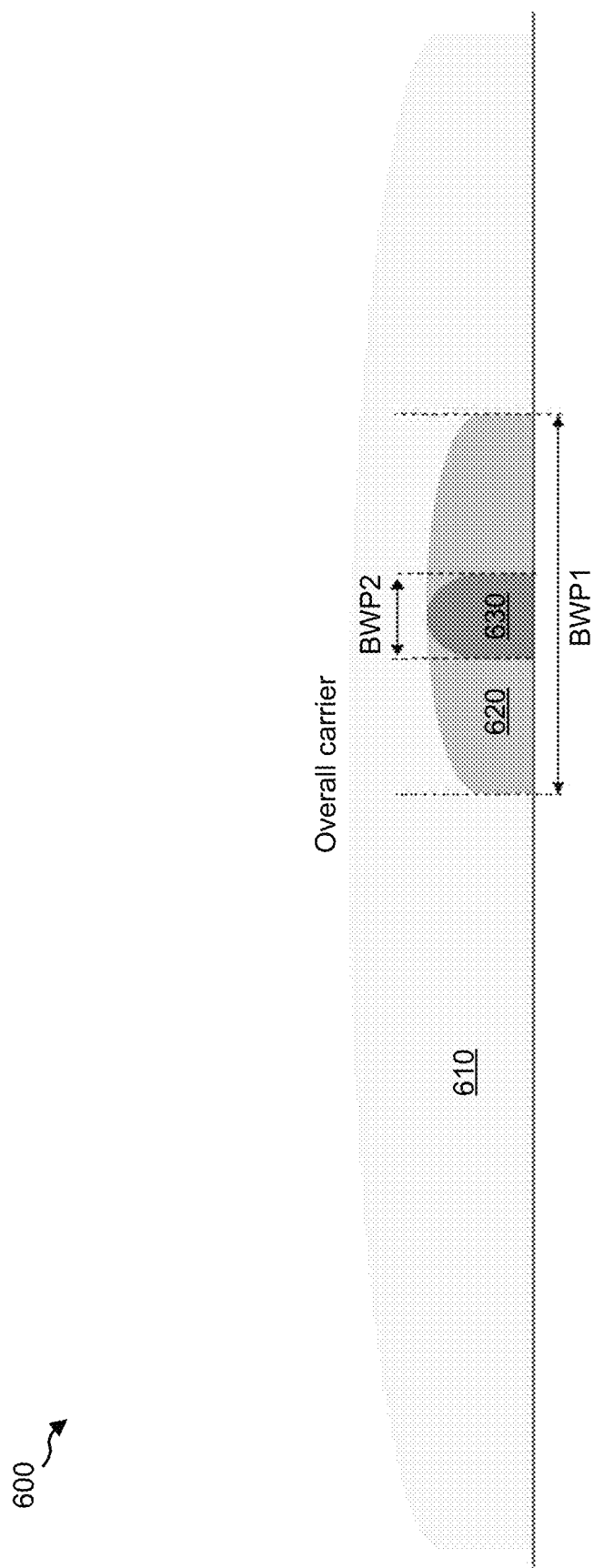

As another example, and as shown in FIG. 6, an overall carrier 610 may span a wideband bandwidth, a first bandwidth part (BWP1) 620 may span a portion of the overall carrier 610, and a second bandwidth part (BWP2) 630 may span a portion of the first bandwidth part. In this case, the first bandwidth part 620 may represent a UE bandwidth capability, and the second bandwidth part 630 may represent a bandwidth to be monitored by or served to the UE 120. For example, the UE 120 may be capable of communicating over the entire first bandwidth part 620, but may be configured to communicate only in the second bandwidth part 630 (e.g., for a time period) to conserve battery power. In this case, the UE 120 may be capable of transitioning between a full bandwidth configuration, where the UE 120 monitors or is served on the first bandwidth part 620, and a bandwidth part configuration where the UE 120 monitors or is served on the second bandwidth part 630. For example, the UE 120 may transition to the full bandwidth configuration when the UE 120 is scheduled to transmit or receive data (e.g., a threshold amount of data), and may transition to the bandwidth part configuration to conserve battery power when the UE 120 is not scheduled to transmit or receive data. In some aspects, the UE 120 may switch between bandwidth parts (e.g., from a narrow bandwidth part to a wide bandwidth part) when the UE 120 has a threshold amount of data to transmit or receive.

Figure 7:
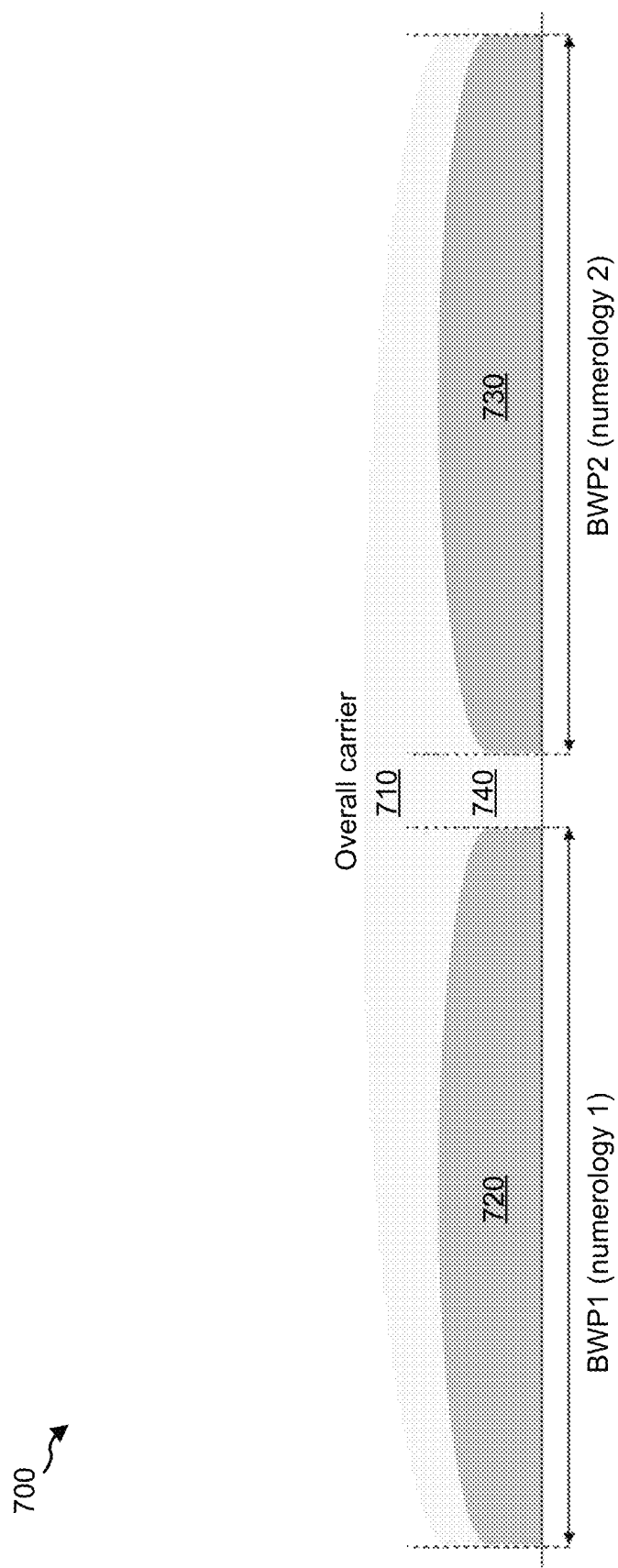

As another example, and as shown in FIG. 7, an overall carrier 710 may span a wideband bandwidth, which may be partitioned into multiple bandwidth parts, such as a first bandwidth part (BWP1) 720 and a second bandwidth part (BWP2) 730. The bandwidth parts 720, 730 may each span a portion of the overall carrier 710. In some aspects, different bandwidth parts may be associated with different numerologies, such as 15 kHz, 30 kHz, 60 kHz, 120 kHz, and/or the like. Additionally, or alternatively, a guard band 740 (e.g., a gap) may be configured between different bandwidth parts to reduce interference between bandwidth parts and/or numerologies. In some aspects, the UE 120 may switch between bandwidth parts when a bandwidth part on which the UE 120 is operating becomes congested. In some aspects, the UE 120 may receive a message from a base station 110 to switch between bandwidth parts. In some aspects, the UE 120 may be limited to using one bandwidth part at a time. In this case, the message from the base station 110 may instruct the UE 120 to deactivate a first bandwidth part and activate a second bandwidth part.

Figure 8:
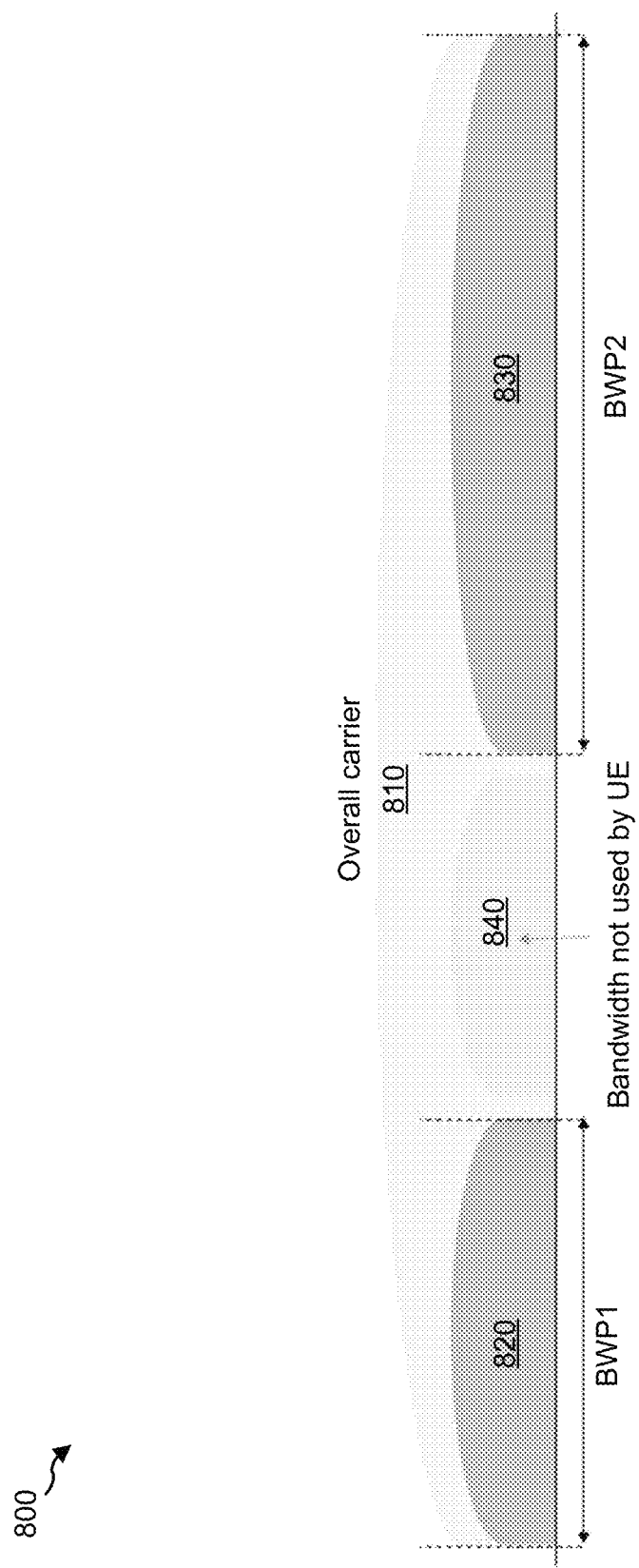

As another example, and as shown in FIG. 8, an overall carrier 810 may span a wideband bandwidth, which may be partitioned into multiple bandwidth parts, such as a first bandwidth part (BWP1) 820 and a second bandwidth part (BWP2) 830. Further, the overall carrier 810 may include a third bandwidth part 840 not used by the UE 120. For example, the first bandwidth part 820 and the second bandwidth part 830 may be associated with the same network operator, and/or may be used to support intra-band carrier aggregation, while the third bandwidth part 840 may be associated with a different network operator and/or may not be used for carrier aggregation. In some implementations, an SS block (e.g., which includes one or more of a PSS, an SSS, a PBCH, and/or the like) may be transmitted on one bandwidth part, and may include information for multiple bandwidth parts to conserve network resources.

In some aspects, a UE 120 may be capable of switching between different bandwidth parts to communicate with a base station 110. For example, a first bandwidth part may be activated and used for communication between the UE 120 and the base station 110. At a later time, the first bandwidth part may be deactivated, and a second bandwidth part may be activated and used for communication between the UE 120 and the base station 110. In this case, the first bandwidth part may no longer be used for communication between the UE 120 and the base station 110 unless the second bandwidth part is deactivated and the first bandwidth part is reactivated.

In some aspects, a UE 120 may communicate with a base station 110 in an uplink grant-free transmission mode. In this mode, resources (e.g., time resources and/or frequency resources) may be allocated for the UE 120 to transmit uplink communications without receiving an uplink grant for every uplink communication. For example, a resource configuration for uplink grant-free transmissions may indicate one or more time resources allocated to the UE 120 for uplink grant-free transmissions, a periodicity of the one or more time resources, one or more frequency resources allocated to the UE 120 for uplink grant-free transmissions, one or more power control parameters for uplink grant-free transmissions by the UE 120, a redundancy version to be used for coding uplink grant-free transmissions, a number of repetitions to be used for uplink grant-free transmissions, and/or the like. The UE 120 may use the resources and/or parameters indicated in the resource configuration to transmit an uplink transmission without receiving an uplink grant or other PDCCH signaling corresponding to the uplink transmission.

In some aspects, uplink grant-free transmissions may be configured in a first mode, referred to as type 1 uplink grant-free transmissions, where the resource configuration is immediately active and usable upon radio resource control (RRC) connection establishment between the UE 120 and the base station 110. In some aspects, uplink grant-free transmissions may be configured in a second mode, referred to as type 2 uplink grant-free transmissions, where the resource configuration is inactive upon radio resource control (RRC) connection establishment, and becomes active and usable as a result of downlink control information (DCI) signaling indicating that the resource configuration is to be activated. Some techniques and apparatuses described herein relate to type 1 uplink grant-free transmissions.

In some cases, a single resource configuration for type 1 uplink grant-free transmissions can be configured per bandwidth part. If a UE 120 is configured with multiple bandwidth parts, the UE 120 can be configured with different resource configurations for uplink grant-free transmissions on different bandwidth parts. Some techniques and apparatuses described herein improve management of resources allocated for uplink grant-free transmissions when a UE 120 switches between different bandwidth parts. In some cases, resources for uplink grant-free transmissions on a deactivated bandwidth part may be released so that the resources can be made available for other communications. However, in some cases, resources for uplink grant-free transmissions on a deactivated bandwidth part may be maintained to reduce over-the-air signaling and reduce latency when the UE 120 switches back to the deactivated bandwidth part. Some techniques and apparatuses described herein permit such resources to be managed differently in different scenarios, which may free up resources, reduce signaling overhead, reduce latency, and/or the like depending on network conditions.

As indicated above, FIGS. 5-8 are provided as examples. Other examples are possible and may differ from what was described in connection with FIGS. 5-8.

Figure 9:
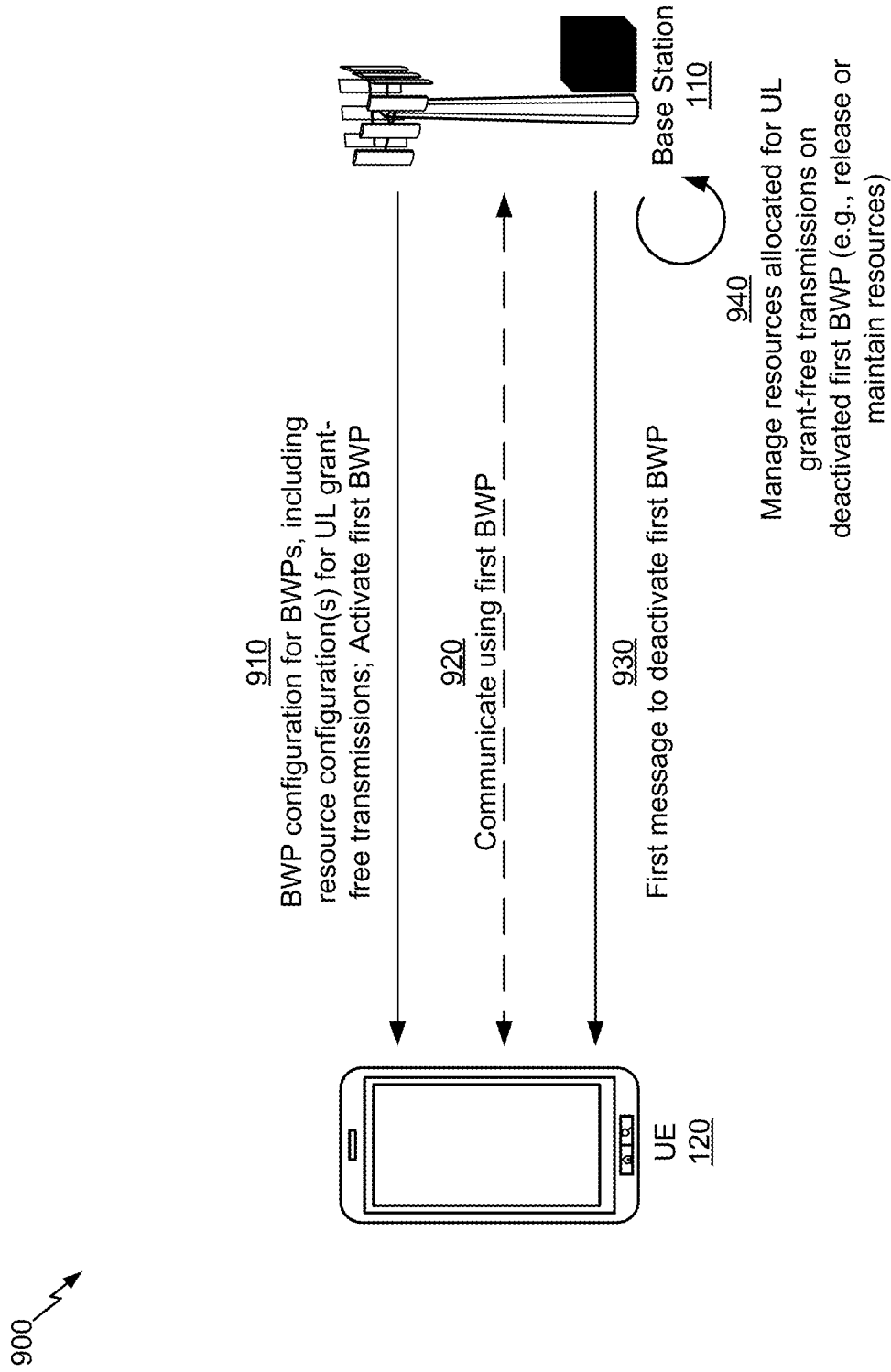
FIGS. 9 and 10 are diagrams illustrating examples relating to managing release of resources for uplink grant-free transmissions on bandwidth part deactivation, in accordance with various aspects of the present disclosure.

FIG. 9 is a diagram illustrating an example 900 relating to managing release of resources for uplink grant-free transmissions on bandwidth part deactivation, in accordance with various aspects of the present disclosure.

As shown by reference number 910, a base station 110 may transmit, and a UE 120 may receive, a bandwidth part configuration for a plurality of bandwidth parts. In some aspects, the bandwidth part configuration may indicate a first bandwidth part that is activated. Additionally, or alternatively, the bandwidth part configuration may indicate one or more bandwidth parts that are deactivated (e.g., a second bandwidth part, a third bandwidth part, and/or the like). In some aspects, the bandwidth part configuration is indicated in an RRC configuration message.

Additionally, or alternatively, the bandwidth part configuration may include a resource configuration for uplink grant-free transmissions on one or more of the indicated bandwidth parts. For example, the bandwidth part configuration may include a resource configuration (e.g., a first resource configuration) that indicates first resources allocated for uplink grant-free transmissions on the first bandwidth part. A resource configuration for uplink grant-free transmissions on the first bandwidth part may indicate one or more time resources allocated to the UE 120 for uplink grant-free transmissions on the first bandwidth part, a periodicity of the one or more time resources, one or more frequency resources allocated to the UE 120 for uplink grant-free transmissions on the first bandwidth part, one or more power control parameters for uplink grant-free transmissions by the UE 120 on the first bandwidth part, a redundancy version to be used for coding uplink grant-free transmissions on the first bandwidth part, a number of repetitions to be used for uplink grant-free transmissions on the first bandwidth part, and/or the like.

Additionally, or alternatively, the bandwidth part configuration may include an indication of whether the first resources are to be released when the first bandwidth part is deactivated. As described in more detail below in connection with reference number 940, the base station 110 may manage the first resources upon deactivation of the first bandwidth part based at least in part on the indication.

Although described above as including a resource configuration and/or an indication of a manner in which to manage resources for a first bandwidth part that is initially activated (e.g., via the RRC configuration message), in some aspects, the bandwidth part configuration may include a resource configuration and/or an indication of a manner in which to manage resources for one or more bandwidth parts that are initially deactivated (e.g., a second bandwidth part, a third bandwidth part, and/or the like). In some aspects, the bandwidth part configuration may include a resource configuration and/or an indication for only an activated bandwidth part. In some aspects, the bandwidth part configuration may include a resource configuration and/or an indication for both an activated bandwidth part and one or more deactivated bandwidth parts. For example, the bandwidth part configuration may indicate first resources allocated for uplink grant-free transmissions on a first bandwidth part indicated as being activated, may indicate second resources allocated for uplink grant-free transmissions on a second bandwidth part indicated as being deactivated, and/or the like.

As shown by reference number 920, the base station 110 and the UE 120 may communicate using the first bandwidth part. For example, the base station 110 may transmit one or more downlink communications to the UE 120 on the first bandwidth part, the UE 120 may transmit one or more uplink communications (e.g., which may include one or more uplink grant-free transmissions) to the base station 110 on the first bandwidth part, and/or the like.

As shown by reference number 930, the base station 110 may transmit, and the UE 120 may receive, a first message to deactivate the first bandwidth part. In some aspects, the first message may indicate that the first bandwidth part is to be deactivated, and/or that a second bandwidth part is to be activated. In some aspects, the UE 120 may determine to deactivate the first bandwidth and/or to activate the second bandwidth part based at least in part on the first message. In some aspects, the base station 110 may determine whether to include a resource configuration (e.g., a second resource configuration), for uplink grant-free transmissions on the second bandwidth part, in the first message. In some aspects, this determination may be based at least in part on the bandwidth part configuration.

For example, if the bandwidth part configuration does not include a resource configuration for the second bandwidth part (e.g., because the second bandwidth part is initially deactivated), then the base station 110 may transmit a resource configuration for the second bandwidth part in connection with the first message that indicates that the second bandwidth part is to be activated (e.g., the resource configuration may be included in the first message, transmitted immediately before or after the first message, and/or the like).

As another example, if the bandwidth part configuration includes a resource configuration for the second bandwidth part, then the base station 110 may not transmit a resource configuration for the second bandwidth part in connection with the first message. Alternatively, if the bandwidth part configuration includes a resource configuration for the second bandwidth part, then the base station 110 may transmit a resource configuration for the second bandwidth part in connection with the first message in order to override the resource configuration included in the bandwidth part configuration. In some aspects, the initial resource configuration in the bandwidth part configuration may be overridden due to network congestion, due to a change in a number of UEs 120 associated with the initial resource configuration and/or that use resources indicated in the initial resource configuration, and/or the like.

As shown by reference number 940, the base station 110 may manage the first resources for the deactivated first bandwidth part based at least in part on transmitting the first message to deactivate the first bandwidth part. In some aspects, the base station 110 may manage the first resources based at least in part on the bandwidth part configuration.

In some aspects, the base station 110 may manage the first resources by releasing the first resources. In this way, the first resources may be made available for other UEs 120 and/or other communications. In some aspects, the base station 110 may immediately release the first resources upon deactivation of the first bandwidth part (e.g., upon transmitting the first message to the UE 120, upon receiving acknowledgement of receipt of the first message, and/or the like). In some aspects, the base station 110 may release the first resources upon expiration of a timer associated with releasing the first resources. In some aspects, the timer may be initialized upon deactivation of the first bandwidth part. In some aspects, the bandwidth part configuration may include an indication of a manner in which the first resources are to be managed, which may indicate whether the first resources are to be immediately released, released after expiration of a timer, maintained (e.g., as described below), and/or the like.

In some aspects, the base station 110 may manage the first resources by releasing resources associated with multiple bandwidth parts. For example, the base station 110 may release resources associated with multiple deactivated bandwidth parts, which may include releasing the first resources associated with the first bandwidth part. In some aspects, the base station 110 may manage the first resources by releasing resources associated with a first subset of deactivated bandwidth parts and maintaining resources associated with a second subset of deactivated bandwidth parts. For example, the base station 110 may maintain the first resources for uplink grant-free transmissions on the first bandwidth part, and may release resources for uplink grant-free transmissions on one or more other deactivated bandwidth parts.

In some aspects, the base station 110 may manage the first resources by maintaining the first resources (e.g., keeping the first resources allocated for uplink grant-free transmissions by the UE 120). In this way, if the first bandwidth part is reactivated for the UE 120, the UE 120 may immediately begin transmitting uplink grant-free transmissions on the reactivated first bandwidth part without waiting for a new resource configuration, thereby reducing latency. Furthermore, signaling overhead may be reduced by avoiding transmission of a new resource configuration for the reactivated first bandwidth part.

In some aspects, the base station 110 may maintain the first resources upon deactivation of the first bandwidth part, but may later (e.g., after the first bandwidth part has been deactivated) transmit an indication to release the first resources. For example, the base station 110 may transmit the indication to release the first resources upon expiration of a timer, based at least in part on a determination that the first bandwidth part has become congested (e.g., with a threshold level of congestion), based at least in part on a request from the UE 120 to release the first resources, and/or the like. In some aspects, the indication to release the first resources may be transmitted in UE-specific DCI. In some aspects, the indication to release the first resources may be transmitted in group-common DCI.

In some aspects, the base station 110 may transmit, and the UE 120 may receive, a second message to reactivate the first bandwidth part, as described in more detail below in connection with FIG. 10. In some aspects, the contents of the second message may differ in different scenarios based at least in part on the bandwidth configuration, the indication of a manner in which resources are to be managed, the management of the resources, and/or the like, as described below.

As indicated above, FIG. 9 is provided as an example. Other examples are possible and may differ from what was described with respect to FIG. 9.

Figure 10:
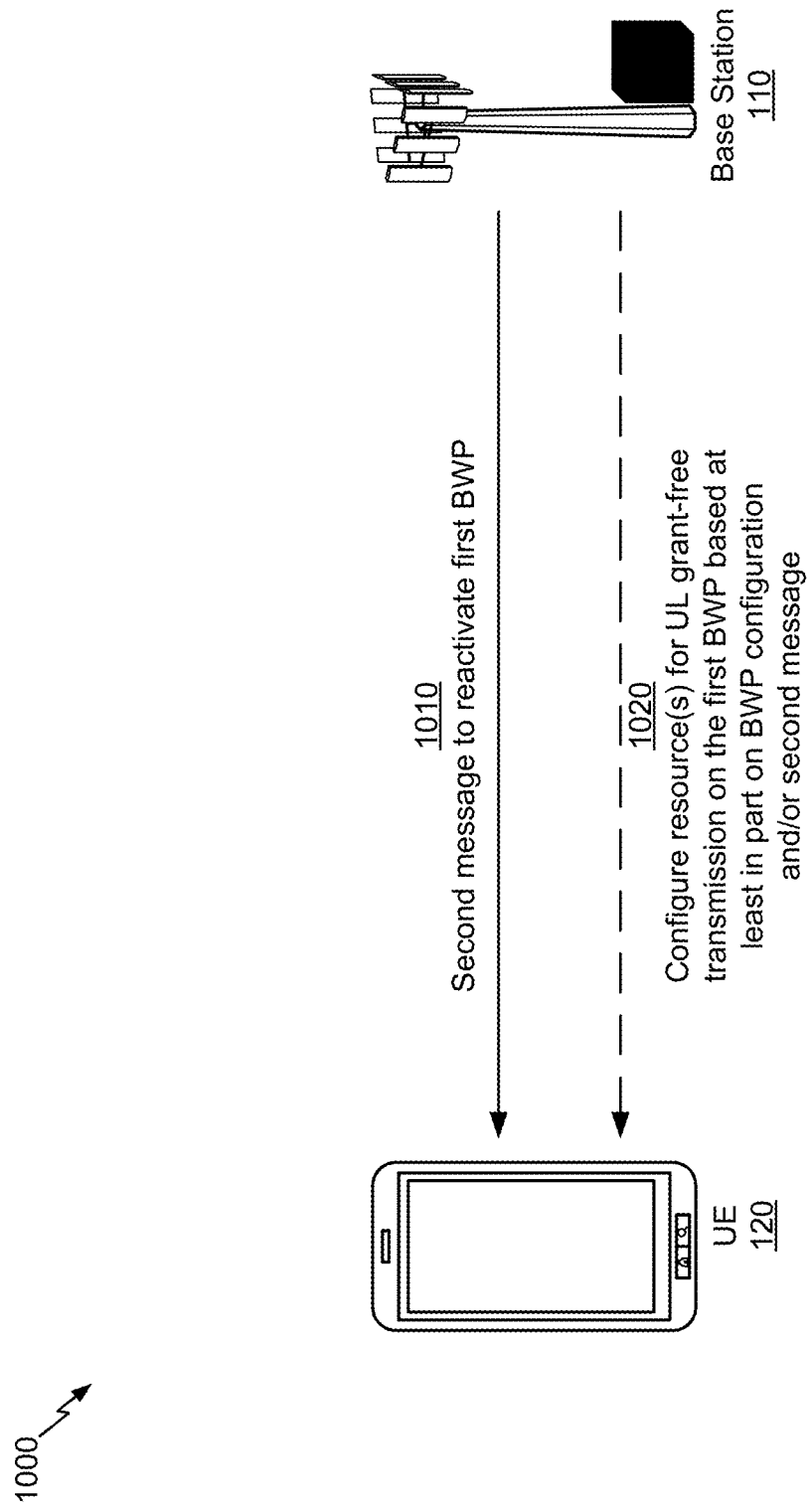

FIG. 10 is a diagram illustrating an example 1000 relating to managing release of resources for uplink grant-free transmissions on bandwidth part deactivation, in accordance with various aspects of the present disclosure.

As shown by reference number 1010, a base station 110 may transmit, and a UE 120 may receive, a second message to reactivate a first bandwidth part. For example, the second message may be communicated after the first bandwidth part has been deactivated, as described above in connection with FIG. 9. In some aspects, the UE 120 may determine to reactivate the first bandwidth based at least in part on the second message. In some aspects, the base station 110 and the UE 120 may communicate using a second bandwidth part after deactivation of the first bandwidth part, and the second bandwidth part may be deactivated when the first bandwidth part is reactivated.

In some aspects, the second message may identify second resources allocated for uplink grant-free transmissions on the reactivated first bandwidth part. For example, when the base station 110 releases the first resources upon deactivation of the first bandwidth part, as described above in connection with FIG. 9, then the base station 110 may indicate the second resources upon reactivation of the first bandwidth part to permit the UE 120 to transmit uplink grant-free transmissions using the second resources. In some aspects, the second resources may be the same as the first resources. In some aspects, the second resources may be different from the first resources.

In some aspects, the second message may exclude an indication of second resources allocated for uplink grant-free transmissions on the reactivated first bandwidth part. For example, when the base station 110 maintains the first resources upon deactivation of the first bandwidth part, as described above in connection with FIG. 9, then the UE 120 may use the first resources to transmit uplink grant-free transmissions upon reactivation of the first bandwidth part. In this case, the base station 110 need not re-indicate the resources to be used for uplink grant-free transmissions, thereby conserving network resources by reducing signaling overhead.

However, in some cases, when the base station 110 maintains the first resources upon deactivation of the first bandwidth part, the base station 110 may determine to override the first resources with second resources (e.g., due to congestion associated with the first resources and/or the like). In this case, the second message may include an indication to release the first resources and to use second resources allocated for uplink grant-free transmissions on the reactivated first bandwidth part. In some aspects, the indication to release the first resources may be explicit. In some aspects, the indication to release the first resources may be implicit (e.g., by indicating the second resources).

Additionally, or alternatively, when the base station 110 maintains the first resources upon deactivation of the first bandwidth part, the base station 110 may later (e.g., after the first bandwidth part has been deactivated) transmit an indication to release the first resources, as described above in connection with FIG. 9. In this case, the second message may indicate second resources allocated for uplink grant-free transmissions on the reactivated first bandwidth part.

As described above in connection with FIG. 9, in some aspects, the base station 110 may transmit an indication of a manner in which the first resources are to be managed (e.g., release the first resources, maintain the first resources, and/or the like). In some aspects, the base station 110 may selectively transmit, in connection with the second message (e.g., in the second message, immediately before or after the second message, and/or the like), a resource configuration for uplink grant-free transmissions on the reactivated first bandwidth part based at least in part on the indication. For example, the base station 110 may transmit the resource configuration for the reactivated first bandwidth part when the indication indicates that the first resources are to be released. As another example, the base station 110 may not transmit the resource configuration for the reactivated first bandwidth part when the indication indicates that the first resources are not to be released (e.g., are to be maintained).

In some aspects, the base station 110 may release the first resources upon expiration of a timer associated with releasing the first resources. In this case, the base station 110 may transmit the resource configuration for the reactivated first bandwidth part when the timer has expired, and may not transmit the resource configuration when the timer has not expired.

As shown by reference number 1020, the UE 120 may configure second resources for uplink grant-free transmissions on the first bandwidth part based at least in part on the bandwidth part configuration or the second message. For example, when the second message does not include a resource configuration for uplink grant-free transmissions on the first bandwidth part, then the second resources may be the same as the first resources, indicated in the bandwidth part configuration, that were previously used for uplink grant-free transmission prior to deactivation of the first bandwidth part. In this way, signaling overhead may be reduced.

As another example, when the second message includes a resource configuration that indicates second resources for uplink grant-free transmissions on the first bandwidth part, then the UE 120 may configure these second resources for uplink grant-free transmissions. In some aspects, the second resources indicated in the second message may be the same as the first resources. In some aspects, the second resources indicated in the second message may be different from the first resources. In some aspects, the second message may indicate the second resources, and may include an indication to release the first resources (e.g., an explicit indication or an implicit indication, as described elsewhere herein).

As described elsewhere herein, in some aspects, the bandwidth part configuration may include an indication of a manner in which the first resources are to be managed. In this case, the UE 120 may identify the second resources based at least in part on the indication. For example, if the indication indicates that the first resources are to be released, then the UE 120 may identify the second resources from the second message. As another example, if the indication indicates that the first resources are to be maintained, then the UE 120 may determine that the second resources are the same as the first resources.

In some aspects, the UE 120 may transmit uplink grant-free transmissions to the base station 110 using the second resources. By managing resources for uplink grant-free transmissions on a deactivated bandwidth part as described herein, some techniques and apparatuses described herein may free up resources, reduce signaling overhead, reduce latency, and/or the like.

As indicated above, FIG. 10 is provided as an example. Other examples are possible and may differ from what was described with respect to FIG. 10.

Figure 11:
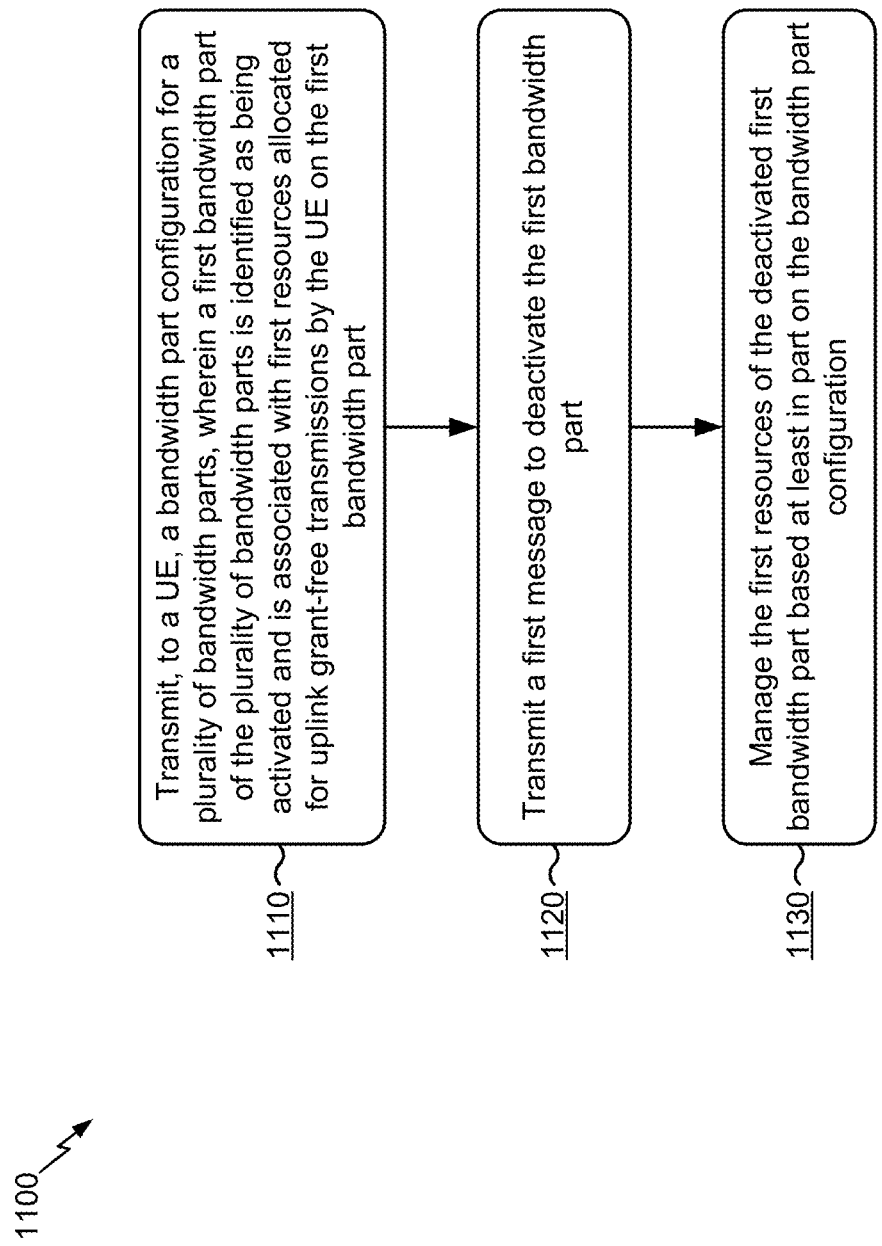
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where a base station (e.g., base station 110 and/or the like) performs operations relating to managing release of resources for uplink grant-free transmissions on bandwidth part deactivation.

As shown in FIG. 11, in some aspects, process 1100 may include transmitting, to a UE, a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part (block 1110). For example, the base station may transmit (e.g., using controller/processor 240, transmit processor 220, TX MIMO processor 230, MOD 232, antenna 234, and/or the like) a bandwidth part configuration for a plurality of bandwidth parts, as described above in connection with FIGS. 9-10. In some aspects, a first bandwidth part of the plurality of bandwidth parts is identified as being activated and is associated with first resources allocated for uplink grant-free transmissions on the first bandwidth part, as described above in connection with FIGS. 9-10.

As further shown in FIG. 11, in some aspects, process 1100 may include transmitting a first message to deactivate the first bandwidth part (block 1120). For example, the base station may transmit (e.g., using controller/processor 240, transmit processor 220, TX MIMO processor 230, MOD 232, antenna 234, and/or the like) a first message to deactivate the first bandwidth part, as described above in connection with FIGS. 9-10.

As further shown in FIG. 11, in some aspects, process 1100 may include managing the first resources of the deactivated first bandwidth part based at least in part on the bandwidth part configuration (block 1130). For example, the base station may manage (e.g., using controller/processor 240 and/or the like) the first resources of the deactivated first bandwidth part based at least in part on the bandwidth part configuration, as described above in connection with FIGS. 9-10.

Process 1100 may include additional aspects, such as any single aspect or any combination of aspects described below and/or in connection with one or more other processes described elsewhere herein.

In some aspects, managing the first resources comprises releasing the first resources. In some aspects, the base station may transmit a second message to reactivate the first bandwidth part, wherein the second message identifies second resources allocated for uplink grant-free transmissions on the reactivated first bandwidth part. In some aspects, the first resources are immediately released upon deactivation of the first bandwidth part. In some aspects, the first resources are released upon expiration of a timer that is initialized based at least in part on deactivation of the first bandwidth part.

In some aspects, managing the first resources comprises maintaining the first resources. In some aspects, the base station may transmit a second message to reactivate the first bandwidth part, wherein the second message excludes an indication of second resources allocated for uplink grant-free transmissions on the reactivated first bandwidth part. In some aspects, the base station may transmit a second message to reactivate the first bandwidth part, wherein the second message includes an indication to release the first resources and to use second resources allocated for uplink grant-free transmissions on the reactivated first bandwidth part.

In some aspects, the first resources are managed based at least in part on an indication, in the bandwidth part configuration, of whether the first resources are to be released when the first bandwidth part is deactivated. In some aspects, the indication is transmitted in a radio resource control (RRC) configuration message. In some aspects, the base station may transmit a second message to reactivate the first bandwidth part; and may selectively transmit, in connection with the second message, a resource configuration for uplink grant-free transmissions on the first bandwidth part based at least in part on the indication. In some aspects, the resource configuration is transmitted when the indication indicates that the first resources are to be released, or the resource configuration is not transmitted when the indication indicates that the first resources are not to be released.

In some aspects, managing the first resources comprises releasing resources associated with multiple bandwidth parts of the plurality of bandwidth parts. In some aspects, managing the first resources comprises maintaining the first resources and releasing resources associated with at least one other bandwidth part of the plurality of bandwidth parts.

In some aspects, the bandwidth part configuration does not indicate second resources allocated for uplink grant-free transmissions on a second bandwidth part that is identified as being deactivated. In some aspects, the bandwidth part configuration indicates second resources allocated for uplink grant-free transmissions on a second bandwidth part that is identified as being deactivated.

In some aspects, managing the first resources comprises maintaining the first resources; and the base station may transmit an indication, after the first bandwidth part has been deactivated, to release the first resources. In some aspects, the indication is transmitted in user equipment (UE)-specific downlink control information. In some aspects, the indication is transmitted in group-common downlink control information.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
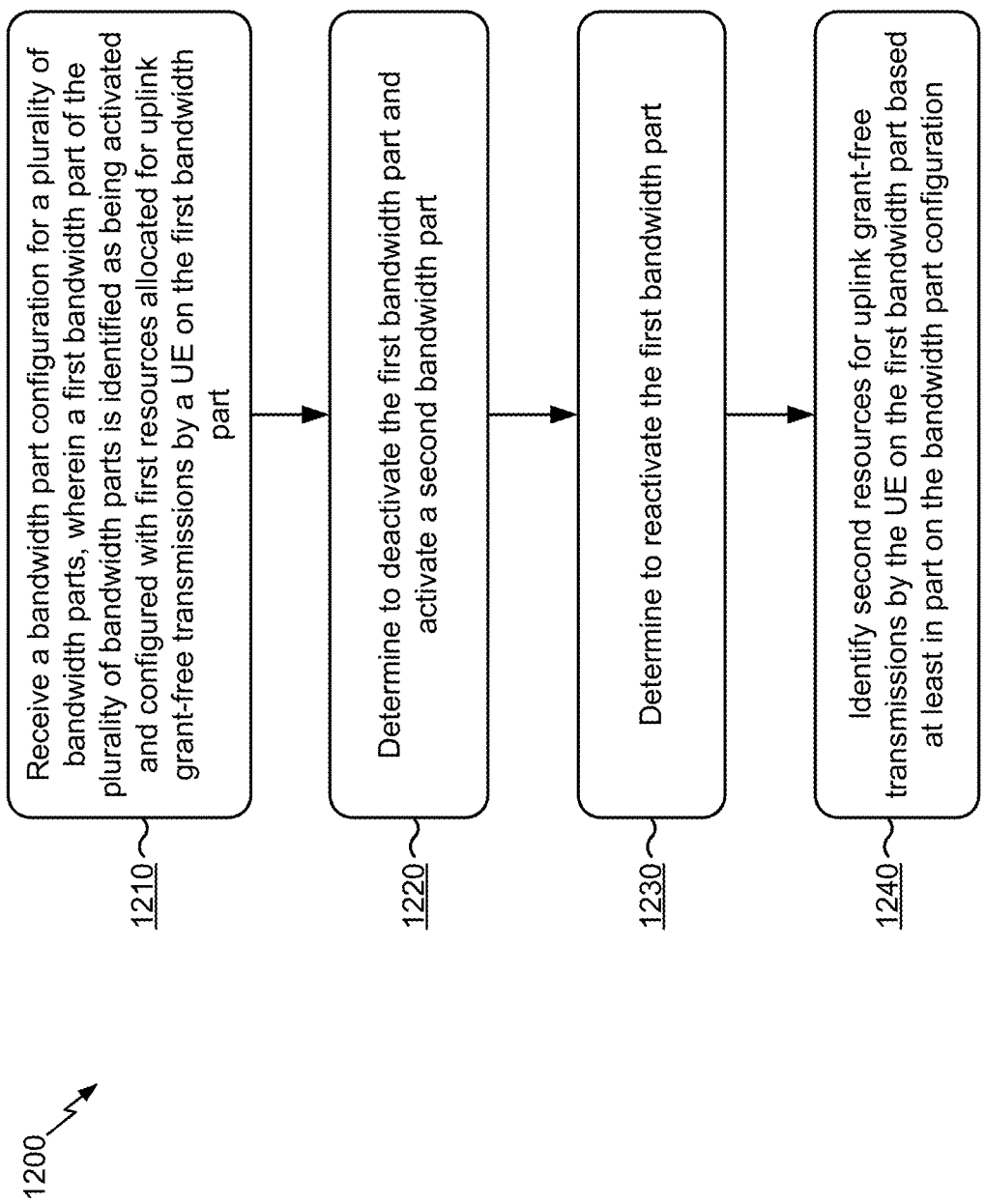
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where a UE (e.g., UE 120 and/or the like) performs operations relating to managing release of resources for uplink grant-free transmissions on bandwidth part deactivation.

As shown in FIG. 12, in some aspects, process 1200 may include receiving a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part (block 1210). For example, the UE may receive (e.g., using antenna 252, DEMOD 254, MIMO detector 256, receive processor 258, controller/processor 280, and/or the like) a bandwidth part configuration for a plurality of bandwidth parts, as described above in connection with FIGS. 9-10. In some aspects, a first bandwidth part of the plurality of bandwidth parts is identified as being activated and is associated with first resources allocated for uplink grant-free transmissions on the first bandwidth part, as described above in connection with FIGS. 9-10.

As further shown in FIG. 12, in some aspects, process 1200 may include determining to deactivate the first bandwidth part and activate a second bandwidth part (block 1220). For example, the UE may determine (e.g., using antenna 252, DEMOD 254, MIMO detector 256, receive processor 258, controller/processor 280, and/or the like) to deactivate the first bandwidth part and activate a second bandwidth part, as described above in connection with FIGS. 9-10. In some aspects, the UE may determine to deactivate the first bandwidth part and activate the second bandwidth part based at least in part on receiving a first message to deactivate the first bandwidth part and activate the second bandwidth part.

As further shown in FIG. 12, in some aspects, process 1200 may include determining to reactivate the first bandwidth part (block 1230). For example, the UE may determine (e.g., using antenna 252, DEMOD 254, MIMO detector 256, receive processor 258, controller/processor 280, and/or the like) to reactivate the first bandwidth part, as described above in connection with FIGS. 9-10. In some aspects, the UE may determine to reactivate the first bandwidth part based at least in part on receiving a second message to reactivate the first bandwidth part.

As further shown in FIG. 12, in some aspects, process 1200 may include identifying second resources for uplink grant-free transmissions by the UE on the first bandwidth part based at least in part on the bandwidth part configuration (block 1240). For example, the UE may identify (e.g., using controller/processor 280 and/or the like) second resources for uplink grant-free transmissions by the UE on the first bandwidth part based at least in part on the bandwidth part configuration, as described above in connection with FIGS. 9-10.

Process 1200 may include additional aspects, such as any single aspect or any combination of aspects described below and/or in connection with one or more other processes described elsewhere herein.

In some aspects, the second resources are the same as the first resources when the second message does not include a resource configuration for uplink grant-free transmissions on the first bandwidth part. In some aspects, the second resources are indicated in the second message. In some aspects, the second message includes an indication to release the first resources.

In some aspects, the UE is configured to identify the second resources based at least in part on an indication, in the bandwidth part configuration, of whether the first resources are to be released when the first bandwidth part is deactivated. In some aspects, the indication is transmitted in a radio resource control (RRC) configuration message.

In some aspects, the bandwidth part configuration does not indicate a resource configuration for uplink grant-free transmissions on the second bandwidth part. In some aspects, the bandwidth part configuration indicates a resource configuration for uplink grant-free transmissions on the second bandwidth part.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station, comprising:
transmitting, to a user equipment (UE), a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part;

transmitting a first message to deactivate the first bandwidth part;

managing the first resources of the deactivated first bandwidth part based at least in part on the bandwidth part configuration, wherein managing the first resources comprises maintaining the first resources for use with the UE; and transmitting a second message to reactivate the first bandwidth part, wherein the second message excludes an indication to the UE of second resources allocated for uplink grant-free transmissions on the reactivated first bandwidth part.

2. The method of claim 1, wherein managing the first resources comprises releasing the first resources.

3. The method of claim 2, further comprising transmitting a second message to reactivate the first bandwidth part, wherein the second message identifies second resources allocated for uplink grant-free transmissions on the reactivated first bandwidth part.

4. The method of claim 2, wherein the first resources are immediately released upon deactivation of the first bandwidth part.

5. The method of claim 2, wherein the first resources are released upon expiration of a timer that is initialized based at least in part on deactivation of the first bandwidth part.

6. The method of claim 1, further comprising transmitting a second message to reactivate the first bandwidth part, wherein the second message includes an indication to the UE to release the first resources and to use second resources allocated for uplink grant-free transmissions on the reactivated first bandwidth part.

7. The method of claim 1, wherein the first resources are managed based at least in part on an indication, in the bandwidth part configuration, of whether the first resources are to be released when the first bandwidth part is deactivated.

8. The method of claim 7, wherein the indication is transmitted in a radio resource control (RRC) configuration message.

9. The method of claim 7, further comprising transmitting a second message to reactivate the first bandwidth part; and
selectively transmitting, in connection with the second message, a resource configuration for uplink grant-free transmissions by the UE on the first bandwidth part based at least in part on the indication.

10. The method of claim 9, wherein the resource configuration is transmitted when the indication indicates that the first resources are to be released by the UE, or wherein the resource configuration is not transmitted when the indication indicates that the first resources are not to be released by the UE.

11. The method of claim 1, wherein managing the first resources comprises releasing resources associated with multiple bandwidth parts of the plurality of bandwidth parts.

12. The method of claim 1, wherein managing the first resources comprises maintaining the first resources for use by the UE and releasing resources associated with at least one other bandwidth part of the plurality of bandwidth parts.

13. The method of claim 1, wherein the bandwidth part configuration does not indicate second resources allocated for uplink grant-free transmissions by the UE on a second bandwidth part that is identified as being deactivated.

14. The method of claim 1, wherein the bandwidth part configuration indicates second resources allocated for uplink grant-free transmissions by the UE on a second bandwidth part that is identified as being deactivated.

15. The method of claim 1, wherein managing the first resources comprises maintaining the first resources for use by the UE; and wherein the method further comprises: transmitting an indication, after the first bandwidth part has been deactivated, to release the first resources.

16. The method of claim 15, wherein the indication is transmitted in at least one of a UE-specific downlink control information message or in a group-common downlink control information message.

17. The method of claim 1, wherein the second resources are different from the first resources.

18. A method of wireless communication performed by a user equipment (UE), comprising:

receiving a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part;

receiving a first message to deactivate the first bandwidth part; and receiving a second message to reactivate the first bandwidth part, wherein the second message excludes an indication of second resources allocated for uplink grant-free transmissions on the reactivated first bandwidth part.

19. The method of claim 18, wherein the second resources are the same as the first resources.

20. The method of claim 18, wherein the second resources are indicated in a message indicating to reactive the first bandwidth part.

21. The method of claim 20, wherein the message includes an indication to release the first resources.

22. The method of claim 18, wherein the UE is configured to identify the second resources based at least in part on an indication, in the bandwidth part configuration, of whether the first resources are to be released when the first bandwidth part is deactivated.

23. The method of claim 22, wherein the indication is transmitted in a radio resource control (RRC) configuration message.

24. The method of claim 18, wherein the bandwidth part configuration does not indicate a resource configuration for uplink grant-free transmissions by the UE on a second bandwidth part.

25. The method of claim 18, wherein the bandwidth part configuration indicates a resource configuration for uplink grant-free transmissions by the UE on a second bandwidth part.

26. The method of claim 18, wherein the second resources are different from the first resources.

27. A base station for wireless communication, comprising:
memory; and
one or more processors coupled to the memory, the memory and the one or more processors configured to:
transmit, to a user equipment (UE), a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part;
transmit a first message to deactivate the first bandwidth part;

manage the first resources of the deactivated first bandwidth part based at least in part on the bandwidth part configuration, wherein managing the first resources comprises maintaining the first resources for use with the UE; and transmit a second message to reactivate the first bandwidth part, wherein the second message excludes an indication to the UE of second resources allocated for uplink grant-free transmissions on the reactivated first bandwidth part.

28. The base station of claim 27, wherein the one or more processors are further configured to transmit a second message to reactivate the first bandwidth part, wherein the second message includes an indication to the UE to release the first resources and to use second resources allocated for uplink grant-free transmissions on the reactivated first bandwidth part.

29. The base station of claim 27, wherein the one or more processors are further configured to:
transmit a second message to reactivate the first bandwidth part; and
selectively transmit, in connection with the second message, a resource configuration for uplink grant-free transmissions by the UE on the first bandwidth part based at least in part on an indication, in the bandwidth part configuration, of whether the first resources are to be released when the first bandwidth part is deactivated.

30. The base station of claim 27, wherein the bandwidth part configuration indicates second resources allocated for uplink grant-free transmissions by the UE on a second bandwidth part that is identified as being deactivated.

31. The base station of claim 27, wherein the one or more processors, when managing the first resources, are configured to maintain the first resources for use by the UE; and wherein the one or more processors are further configured to transmit an indication, after the first bandwidth part has been deactivated, to release the first resources.

32. The base station of claim 31, wherein the indication is transmitted in at least one of a UE-specific downlink control information message or in a group-common downlink control information message.

33. The base station of claim 27, wherein the second resources are different from the first resources.

34. A user equipment (UE) for wireless communication, comprising:
memory; and
one or more processors coupled to the memory, the memory and the one or more processors configured to:
receive a bandwidth part configuration for a plurality of bandwidth parts, wherein a first bandwidth part of the plurality of bandwidth parts is identified as being activated and is associated with first resources allocated for uplink grant-free transmissions by the UE on the first bandwidth part;
receive a first message to deactivate the first bandwidth part; and
receive a second message to reactivate the first bandwidth part, wherein the second message excludes an indication of second resources allocated for uplink grant-free transmissions on the reactivated first bandwidth part.

35. The UE of claim 34, wherein the second resources are the same as the first resources.

36. The UE of claim 34, wherein the second resources are indicated in a message indicating to reactive the first bandwidth part.

37. The UE of claim 36, wherein the message includes an indication to release the first resources.

38. The UE of claim 34, wherein the UE is configured to identify the second resources based at least in part on an indication, in the bandwidth part configuration, of whether the first resources are to be released when the first bandwidth part is deactivated.

39. The UE of claim 34, wherein the bandwidth part configuration indicates a resource configuration for uplink grant-free transmissions by the UE on a second bandwidth part.

40. The UE of claim 34, wherein the second resources are different from the first resources.

* * * * *